United States Patent [19]

Schultz et al.

[11] Patent Number: 5,154,877
[45] Date of Patent: Oct. 13, 1992

[54] PASSIVE OFF-SITE RADIATION REDUCTION APPARATUS

[75] Inventors: Terry L. Schultz, Murrysville Boro; Naum I. Alper, Monroeville, both of Pa.

[73] Assignee: Westinghouse Electric Corp., Pittsburgh, Pa.

[21] Appl. No.: 676,405

[22] Filed: Mar. 28, 1991

[51] Int. Cl.⁵ .............................................. G21C 13/00
[52] U.S. Cl. .................................. 376/293; 376/299; 376/314
[58] Field of Search ................. 376/298, 299, 293, 314

[56] References Cited

U.S. PATENT DOCUMENTS

| | | | |
|---|---|---|---|
| 3,258,403 | 6/1966 | Malay | 376/293 |
| 4,057,464 | 11/1977 | Mair et al. | 376/314 |
| 4,277,361 | 7/1981 | Szulinski | 376/314 |
| 4,753,771 | 6/1988 | Conway et al. | 376/298 |
| 4,959,193 | 9/1990 | Hunsbedt et al. | 376/293 |
| 5,043,135 | 8/1991 | Hunsbedt et al. | 376/299 |
| 5,043,136 | 8/1991 | Hunsbedt et al. | 376/293 |
| 5,049,353 | 9/1991 | Conway et al. | 376/293 |

Primary Examiner—Daniel D. Wasil
Attorney, Agent, or Firm—M. G. Panian

[57] ABSTRACT

A method and apparatus for use in conjunction with a passive nuclear reactor containment cooling system to significantly reduce the release of radiation and resulting off-site doses is disclosed. Gases that may contain radioactive materials are drawn from a penetration room and pass through a filter prior to being fed into the passive containment airflow path. Low pressure areas are created in the passive containment airflow path by means of eductor/airfoils. Such low pressure zones draw the gases from the penetration rooms.

22 Claims, 3 Drawing Sheets

PASSIVE OFF-SITE RADIATION REDUCTION APPARATUS

BACKGROUND OF THE INVENTION

1. Field of the Invention

The present invention relates to the field of nuclear reactors. More specifically, it relates to an improved apparatus for reducing radiation leakage from such nuclear reactors.

2. Description of the Prior Art

The release of radiation from nuclear reactors and the maximum radiation doses (measures of the amount of radiation exposure to a medium) are closely regulated by the NRC. In a typical nuclear reactor, a containment structure is provided around the core of the system, which usually includes several major pieces of equipment, to limit the release of such radiation doses. In some cases, however, where further reduction is required or desired in the radiation dose level, a second containment structure is added surrounding the primary containment and filters and fans are added between the two containment layers.

Alternatively, in order to dissipate the heat generated by a nuclear reactor core, some nuclear reactor systems utilize passive cooling. In such passive cooling systems, a second containment is not practical because a further containment structure would prohibit airflow to the primary containment and, thus, hinder cooling.

Accordingly, a need exists for a method or apparatus that can reduce radiation dose levels in such nuclear reactors utilizing passive cooling without hindering the airflow needed for such passive cooling.

SUMMARY OF THE INVENTION

The present invention is directed to a method and apparatus for utilizing the characteristics of existing passive containment cooling systems to significantly reduce the release of radiation and the resulting off-site doses, particularly under accident conditions. Air drawn from a penetration room of such a nuclear reactor system passes through a charcoal filter that removes radiation-bearing materials. The discharge from the filters then joins with the containment passive cooling airflow that is discharged from the plant at an elevated location above the reactor. Low pressure areas manufactured within the containment passive cooling airflow act to create the driving force necessary to draw the air from the penetration room, through the charcoal filters, and into the cooling airflow. The elevated discharge point of warm air, which is buoyant, further reduces radiation exposure near the reactor through dispersion.

Accordingly, it is an object of the present invention to provide a method and apparatus for reducing the release of radiation from passive nuclear reactor cooling systems. It is a further object to provide a method and apparatus of removing a majority of the radiation leakage into a reactor penetration room during any period of increased reactor temperature. These and further objects and advantages will be apparent to those skilled in the art in connection with the detailed description of the invention that follows and are set forth in detail in the appended claims.

DETAILED DESCRIPTION OF THE PREFERRED EMBODIMENTS

Figure 1:
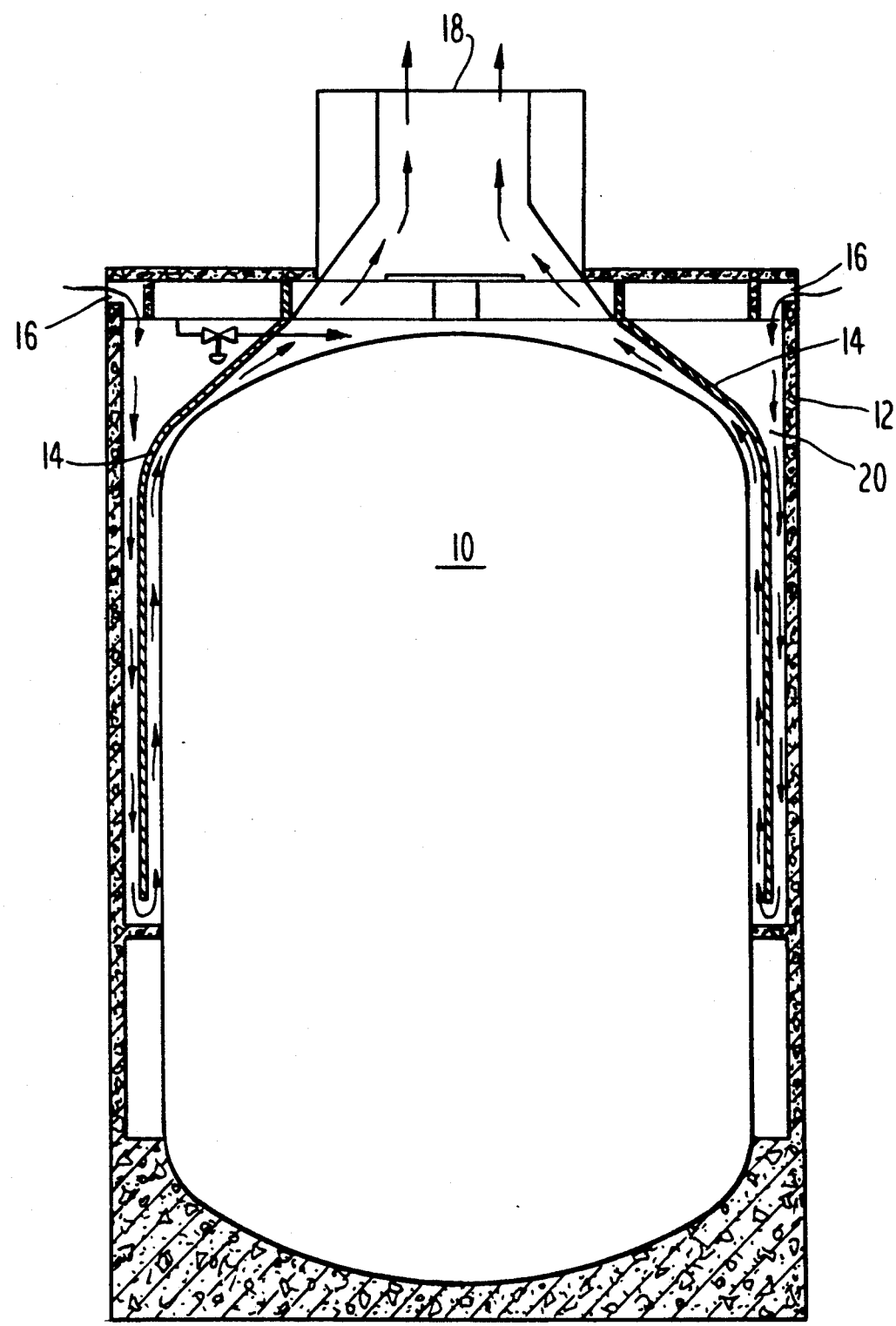
FIG. 1 is a sectional view of a typical nuclear reactor utilizing passive cooling as known in the prior art.

Turning in detail to the drawings, where like numbers refer to like items, FIG. 1 represents a typical passive cooling system as would be presently used in nuclear systems. The principal components of the nuclear reactor are contained within a containment structure 10 which is further surrounded by an overall shielding structure 12. In a passive cooling system, a baffle 14 surrounds the containment structure 10 in its upper portions and is positioned between the containment structure 10 and the shielding structure 12. The shielding structure 12 incorporates one or more air inlets 16. The containment structure 10 also includes a heated air discharge port 18 passing upwardly out of the shielding structure 10 and normally open to the atmosphere.

Thus, a passageway 20 is created between the containment structure 10 and the shielding structure 12 whereby cooling gases or air can enter the shielding structure 12 through air inlet 16, flow down the outside of baffle 14 between the baffle 14 and the shielding structure 12, pass beneath the bottom of the baffle 14, then flow upwardly between the containment structure 10 and the baffle 14, and finally exit to the atmosphere via heated air discharge port 18. Because hot air rises, heat dissipating through the containment structure 10 acts to heat the gases situated between the containment structure 10 and the baffle 14, causing them to rise and pass out through heater air discharge port 18. As the heated gases rise, the partial vacuum created draws further cooling gases into the passageway 20 via inlet 16. The more heat that is generated within the reactor that must be dissipated from the containment structure 10, the faster the gases between the containment 10 and the baffle 14 will heat and the faster that cooling gases will move through passageway 20.

An example of this type of passive cooling system is disclosed in U.S. Pat. No. 4,753,771 (Conway et al.) at FIG. 4.

As a result of this passive cooling system, any radioactive materials or gases leaking from the containment structure 10 into passageway 20 during operation will typically exit through the heated air discharge port 18 and out through the top of the shielding structure 12.

Further, it is estimated that the vast majority of radiation leakage out of the containment structure actually occurs in, and through, the penetration rooms due to the presence of electrical wiring, conduits, pipes, etc. These penetration rooms are separated from the passive cooling system and, thus, any radiation leakage into these rooms will not be removed out of the top of the structure through the passive cooling system. Additionally, because accidents tend to generate more heat, they also tend to build up the pressure in the containment structure 10. This increased pressure and heat leads to an increase in radiation leakage.

Figure 2:
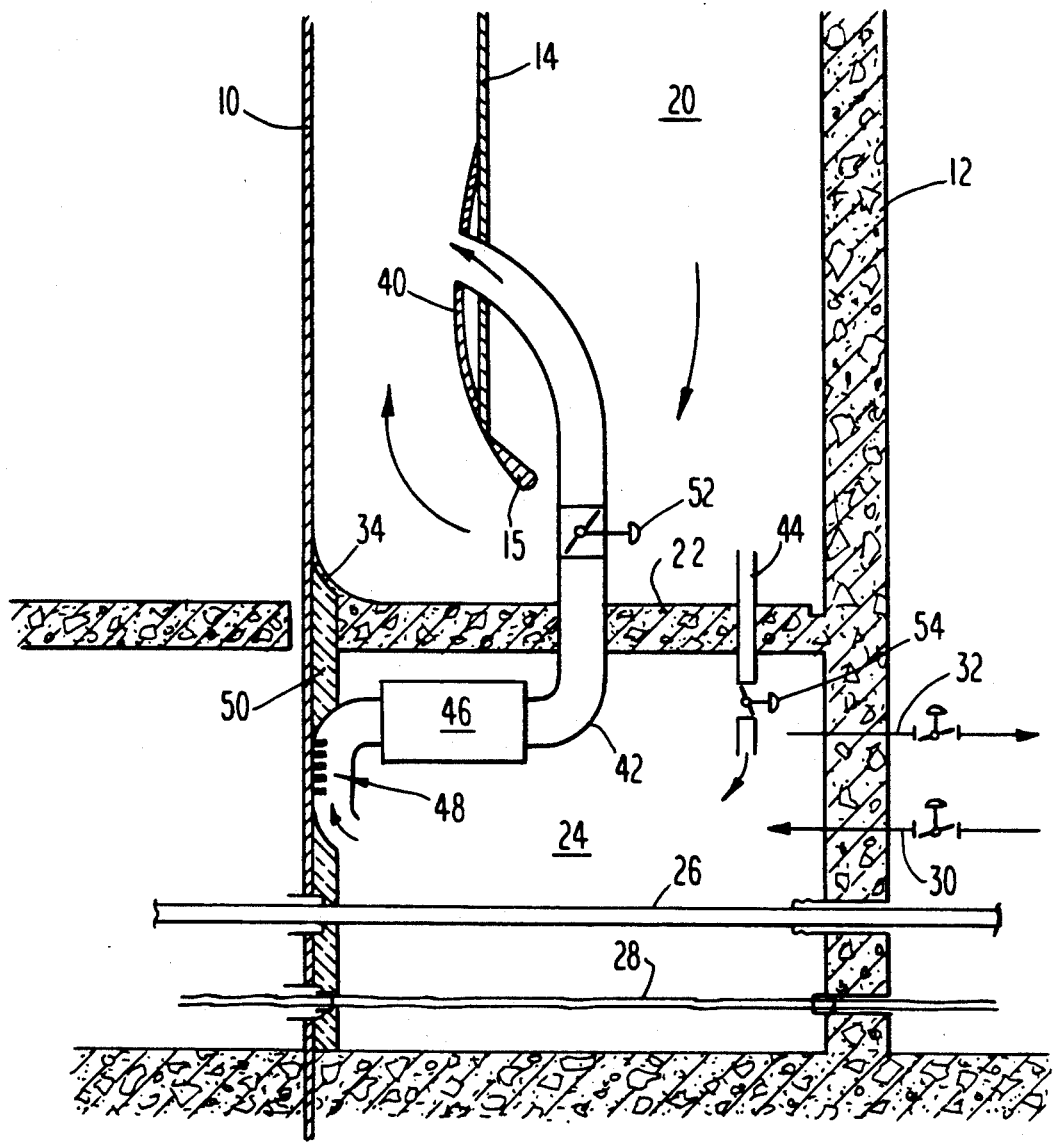
FIG. 2 is a cross-sectional schematic drawing of one embodiment of the apparatus of the present invention.

The area in the lower right of FIG. 1 indicated by the dotted line is blown up in schematic fashion in FIG. 2 and illustrates one embodiment of the present invention. As in FIG. 1, a passageway 20 is created between the containment structure 10 and the shielding structure 12 by baffle 14. Baffles 14, as used in passive cooling systems, often have an airfoil 15 attached at their lower edge in order to improve the pressure driven flow in passageway 20.

In a typical nuclear plant, a floor 22 acts to separate such a passageway 20 from one or more penetration rooms 24. Certain mechanical piping 26 and electrical wiring 28 typically pass from the containment structure 10 into, and through, the penetration rooms 24 and thereafter out of shielding structure 12. It is these breaches of the containment structure 10 that are thought to be the primary cause of radiation leakage.

In addition, such a penetration room 24 will typically have inlets 30 and outlets 32 for operation of a normal HVAC system. Finally, standard nuclear reactors require that a gap in the floor 22 be provided on the inside of containment structure 10. This gap allows for the containment to move, expand, and contract depending upon conditions existing within containment. Consequently, an additional flange 34 must be provided to complete passageway 20 and seal the passageway 20 from the penetration room 24.

Turning now to the modifications, improvements, and apparatus embodying the present invention, an additional eductor/airfoil 40 is preferably constructed as an integral part of the lower portion of baffle 14 and in conjunction with any existing airfoil 15. The shape of this eductor/airfoil 40 in relation to the normal direction of gaseous flow within the passageway accentuates the creation of a low pressure zone within the passageway 20 near the trailing edge of the eductor/airfoil 40 between the containment structure 10 and the baffle 14. The precise shape of eductor/airfoil 40 can be modified as needed as would be known to those of skill in the art.

A duct 42 is configured to extend with one end opening in the penetration room 20 and the other end opening at, or near, the low pressure zone in passageway 20. In one preferred embodiment, as shown in FIG. 2, the upper end of duct 42 is integrally formed with eductor/airfoil 40 at, or near, the trailing edge of the eductor/airfoil 40 after passing through the baffle 14. The low pressure zone created by a combination of gaseous heating as heat dissipates through containment structure 10 and the airfoil affect of eductor/airfoil 40 draws additional gaseous material from the duct 42, thereby acting to draw gases from the penetration room 24 into the duct 42. To aid in the creation and maintenance of this beneficial airflow, additional piping 44 connects the passageway 20 to the penetration room 24 from a point in the passageway 20 where gaseous flow is in a downward direction. Thus, cool gases will be drawn into the penetration room from the outer portion of passageway 20, will then be drawn into the convection current airflow of passageway 20 through duct 42, and, thereafter, will ultimately be carried out to the atmosphere in the passageway airflow through the heated air discharge port 18 in the top of the shielding structure 12.

A filter 46 is constructed integrally with the duct 42 and acts to filter any gaseous material passing through the duct 42 prior to the entry of such gases into passageway 20. This filter can be a very fine mechanical filter, a charcoal filter, or a combination thereof effective to remove the majority of the radioactive materials that might leak from the containment structure 10.

Additionally, because high humidity may inhibit the effectiveness of typical charcoal filters, in one preferred embodiment, heat fins 48 may be designed to extend from the containment structure 10 and into the duct 42 within the penetration room 24. Such heat fins 48 will act to transfer heat from inside of the containment structure 10 to the gaseous material entering the duct 42 before it enters the filter 46, thereby warming such gaseous material and reducing its relative humidity.

On the other hand, in order to reduce the overall heat input to the penetration room 24 from the containment structure 10, thereby maintaining the penetration room 24 comparatively cool and passively aiding in the drawing in of gases through piping 44, insulation 50 can be added between the penetration room 24 and the containment structure 10.

Continuous airflow through the filter 46 decreases the effectiveness of most filters. Therefore, a pair of fail-open valves 52 and 54 can be included in duct 42 and piping 44, respectively. Such fail-open valves 52 and 54 can be located at any point along the duct 42 and piping 44, respectively, and act to prevent gaseous flow through the duct 42 and piping 44 when closed. Thus, in one preferred embodiment, the apparatus of the present invention is not utilized unless an accident or other out of the ordinary heat-up occurs within the containment structure 10. At such time, the fail-open valves 52 and 54 would be opened, either automatically or manually, and excess heat from the containment structure 10 would be used both to accelerate gas flow in passageway 20 and to heat gaseous materials entering duct 42 by means of heat fins 48. At the same time, inlet 30 and outlet 32 to the normal HVAC system would typically be closed for the duration of such an accident or heat-up.

As a further optional means of reducing leakage from the containment structure 10, air bottles (not shown) may be used to pressurize the space between the double seals that are typically used in the electrical penetration and in the equipment and personnel hatches in order to eliminate leakage from these sources.

While it is believed that the inventive concept of drawing gaseous material through filtered duct work and into the passive cooling system passageway 20 will operate even in the absence of an added eductor/airfoil 40, use of such an eductor/airfoil 40 is preferred to increase the pressure differential within the passageway that acts as the driving force of the system. In order to operate the apparatus according to the present invention, a pressure differential sufficient to overcome the resistance of flow through the filter 46 must be created. In a typical filter, this differential might be on the order of two inches of water.

The eductor/airfoil 40 of the present invention can be arranged in any of a variety of manners between the containment structure 10 and baffle 14. In FIG. 2, for example, the eductor/airfoil 40 is attached directly to the baffle such that its airfoil surface extends outwardly from the baffle surface. In order for the exit end of the duct 42 to be integrally formed with such an eductor/airfoil 40, the duct 42 will have to curve or bend around and through the baffle 14.

Figure 3:
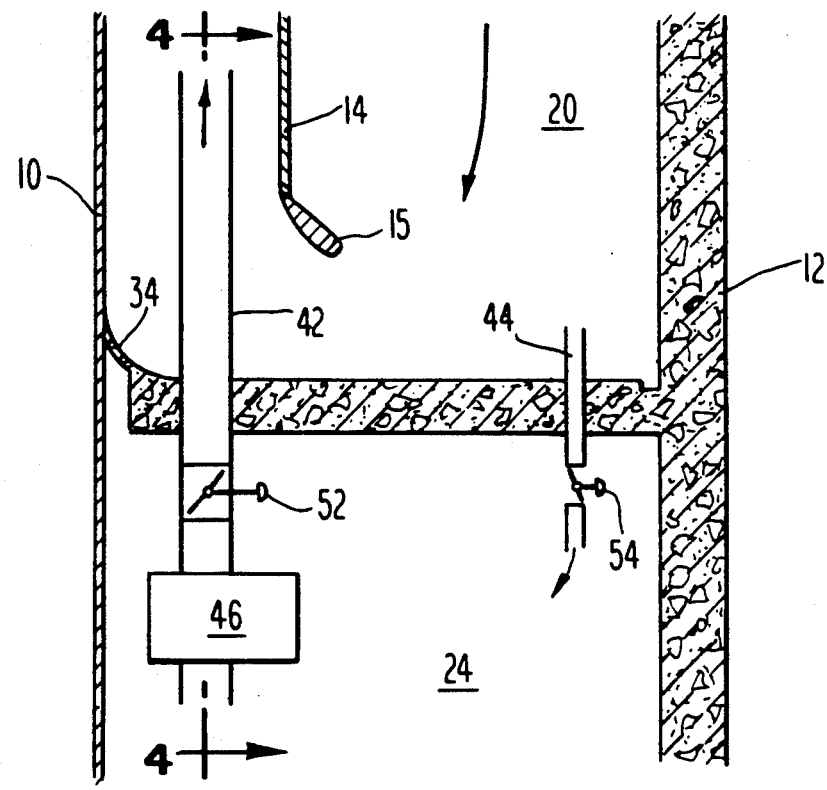
FIG. 3 is a cross-sectional schematic drawing of a second embodiment of the apparatus of the present invention.
Figure 4:
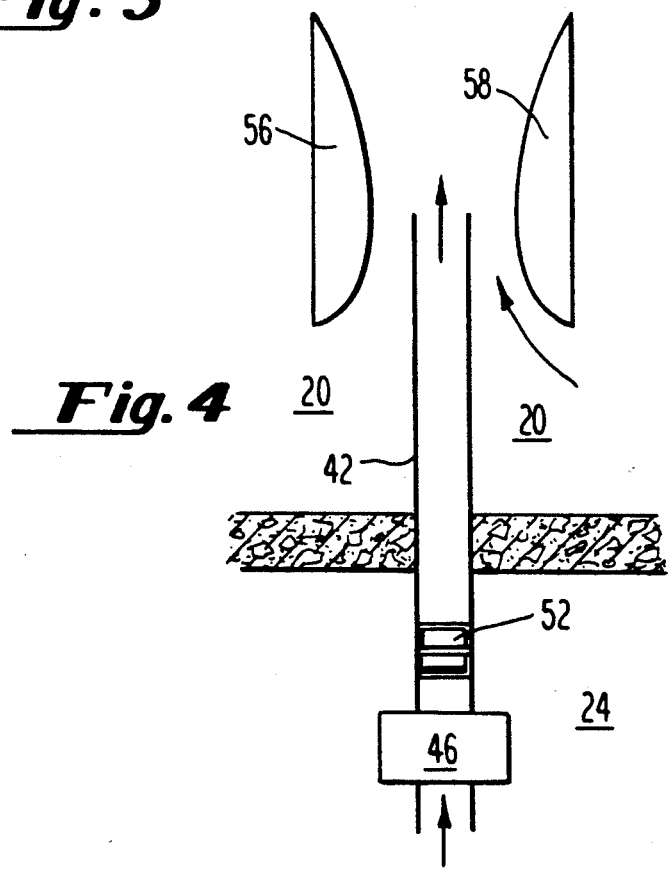
FIG. 4 is a cross-sectional view of the embodiment of FIG.3, taken through the A—A plane of FIG. 3.

In the alternative embodiment of FIGS. 3 and 4, on the other hand, a pair of eductor/airfoils 56 and 58 are mounted between the containment structure 10 and the baffle 14 and span the passageway 20 between the two existing surfaces and on opposite side of duct 42. In this embodiment, the exit of duct 42 is not integrally constructed with the eductor/airfoils 56 and 58, but rather opens at a point between them where a low pressure zone has been created. As such, there is no need for the duct 42 to bend around and through the baffle 14. In this embodiment, the duct 42 can be structured as a vertical tube.

Thus, the method and apparatus disclosed above provides a way in which to significantly reduce the release of radiation and the resulting off-site doses under normal and accident conditions. Having thus described the invention, it is to be understood that the invention is not limited to the embodiments set forth herein for purposes of exemplification. It is to be limited only by the scope of the attached claims, including a full range of equivalents to which each claim thereof is entitled.

What is claimed is:

1. In a passive containment cooling system for use in nuclear reactors having a shield structure, a containment structure therein, and a passageway wherein cooling gases are drawn into an upper portion of the shield structure of the nuclear reactor through one or more openings, flow down the outside and then around the bottom of an approximately cylindrical baffle mounted within a shield structure but outside of the containment structure, and thereafter flow upwardly between the containment structure and the baffle to a heated air discharge port in the shield structure, the improvement comprising:

a duct having an inlet end and an exit end wherein the duct connects a penetration room that is located between the containment structure and the shield structure and below the passive cooling system to a point in the passageway located between the containment structure and the baffle;

a filter capable of filtering out radioactive material mounted integrally with the duct to filter any gases passing through the duct; and an inlet pipe connecting the passageway to the penetration room at a point where the cooling gases are flowing downwardly.

2. The improved passive cooling system of claim 1 further comprising:

one or more airfoils mounted within the passageway at a location between the containment structure and the baffle that act on the cooling gases to create a low pressure zone at, or near, the exit point of the duct.

3. The improved passive cooling system of claim 2 wherein one of the one or more airfoils is mounted onto the baffle and wherein the exit point of the duct is formed within the surface of the airfoil at, or near, a trailing edge of the airfoil.

4. The improved passive cooling system of claim 2 wherein a pair of the airfoils are each mounted to the containment structure and to the baffle so as to extend therebetween on opposite sides of the duct.

5. The improved passive cooling system of claim 1 wherein a portion of the duct within the penetration room between the inlet end and the filter is located adjacent to the containment structure and includes one or more heat fins extending inwardly from the containment structure into the duct to transfer heat from the containment structure to the gases within the duct.

6. The improved passive cooling system of claim 5 further comprising:

insulation mounted so as to insulate the penetration room from the containment structure except where the duct adjoins the containment structure.

7. The improved passive cooling system of claim 1 wherein the filter is comprised of a fine mechanical filter, a charcoal filter, or a combination of a fine mechanical filter and a charcoal filter.

8. The improved passive cooling system of claim 1 wherein the duct, the inlet pipe, or both further includes a fail-open valve.

9. A passive off-site radiation reduction apparatus for use in a nuclear reactor having a containment structure and an outer shield structure comprising:

a heated air discharge port in the top of the shield structure;

one or more openings in an upper portion of the shield structure;

a baffle mounted within the shield structure but outside of the containment structure that cooperates with the shield structure, the one or more openings, and the containment structure to create a passageway wherein cooling gases can be drawn into the shield structure through the one or more openings, flow down the outside and then around the bottom of the baffle, and thereafter flow upwardly between the containment structure and the baffle, exiting the shield structure through the heated air discharge port;

a duct having an inlet end and an exit end wherein the duct connects a penetration room that is located between the containment structure and the shield structure and below the passageway to a point in the passageway located between the containment structure and the baffle;

a filter capable of filtering out radioactive material mounted integrally with the duct to filter any gases passing through the duct; and an inlet pipe connecting the passageway to the penetration room at a point further removed from the containment structure than the exit end of the duct.

10. The radiation reduction apparatus of claim 9 further comprising:

one or more airfoils mounted within the passageway at a location between the containment structure and the baffle, arranged to create a low pressure zone at, or near, the exit end of the duct when gases flow through the passageway.

11. The radiation reduction apparatus of claim 10 wherein an airfoil is mounted to the baffle and the exit end of the duct is formed within the surface of the airfoil at, or near, a trailing edge of the airfoil.

12. The radiation reduction apparatus of claim 10 wherein a pair of the airfoils are each mounted to the containment structure and to the baffle so as to extend therebetween on opposite sides of the duct.

13. The radiation reduction apparatus of claim 10 wherein a portion of the duct within the penetration room between the inlet end and the filter is located adjacent to the containment structure and includes one or more heat fins extending inwardly from the containment structure and into the duct to transfer heat from the containment structure to the gases within the duct.

14. The radiation reduction apparatus of claim 13 further comprising:

insulation mounted so as to insulate the penetration room from the containment structure except where the duct adjoins the containment structure.

15. The radiation reduction apparatus of claim 10 wherein the filter is comprised of a fine mechanical filter, a charcoal filter, or a combination of a fine mechanical filter and a charcoal filter.

16. The radiation reduction apparatus of claim 10 wherein the duct, the inlet pipe, or both further includes a fail-open valve.

17. A nuclear reactor having a containment structure and an outer shield structure further including a passive off-site radiation reduction apparatus comprising:
- a heated air discharge port in the top of the shield structure;
- one or more openings in an upper portion of the shield structure;
- a baffle mounted within the shield structure that cooperates with the shield structure and the structure to create a passageway wherein cooling gases can be drawn into the shield structure through the one or more openings, flow down the outside and then around the bottom of the baffle, and thereafter flow upwardly between the containment structure and the baffle to the heated air discharge port;
- a duct having an inlet end and a fail-open valve wherein the inlet end is located within a penetration room that is located between the containment structure and the shield structure and below the passageway and the duct connects the penetration room to an exit point in the passageway located between the containment structure and the baffle;
- a filter capable of filtering out radioactive material mounted integrally with the duct to filter any gases passing through the duct;
- a portion of the duct within the penetration room between the inlet end and the filter being located adjacent to the containment structure and including one or more heat fins extending inwardly from the containment structure and into the duct to transfer heat from the containment structure to the gases within the duct;
- insulation mounted so as to insulate the penetration room from the containment structure except where the duct adjoins the containment structure;
- one or more airfoils mounted within the passageway at a location between the containment structure and the baffle, arranged to create a low pressure zone at the exit point of the duct when gases flow through the passageway; and
- an inlet pipe connecting the passageway to the penetration room at a point further removed from the containment structure than the duct.

18. The nuclear reactor of claim 17 wherein an airfoil is mounted to the baffle and the exit point of the duct is formed within the surface of the airfoil at, or near, a trailing edge of the airfoil.

19. The nuclear reactor of claim 17 wherein a pair of airfoils are each mounted both to the containment structure and to the baffle so as to extend therebetween on opposite sides of the duct.

20. An improved method of passively reducing radiation leakage from a nuclear reactor having a shield structure with one or more openings, a containment structure, and a passageway wherein cooling gases are drawn into an upper portion of the shield structure of the nuclear reactor through the one or more openings, flow down the outside and then around the bottom of an approximately cylindrical baffle mounted within the shield structure, and thereafter flow upwardly between the containment structure and the baffle to a heated air discharge port in the shield structure comprising the steps of:
- filtering gases from a penetration room located between the containment structure and the shield structure and below the passageway; and
- passing such filtered gases to the passageway at an exit point between the containment structure and the baffle,
- wherein the gases are drawn into the passageway by the creation of a low pressure zone at the exit point by use of one or more airfoils mounted within the passageway at a location between the containment structure and the baffle.

21. The improved method of claim 20 further comprising the step of heating the gases to be filtered by means of one or more heat fins extending inwardly from the containment structure.

22. The improved method of claim 20 wherein a valve acts to prevent passage of gases to the exit point until the nuclear reactor begins to generate above-average amounts of heat.

* * * * *